United States Patent [19]

Bourdage

[11] Patent Number: 4,907,936

[45] Date of Patent: Mar. 13, 1990

[54] WHEELCHAIR LIFT FOR VEHICLES

[75] Inventor: Fernand J. Bourdage, Nepean, Canada

[73] Assignee: Joyride Company, Ontario, Canada

[21] Appl. No.: 234,211

[22] Filed: Aug. 18, 1988

[51] Int. Cl.[4] .................................................. B60P 1/44

[52] U.S. Cl. .................................... 414/545; 414/540; 414/921; 414/539; 187/9 R; 187/12

[58] Field of Search ............... 414/921, 563, 539, 540, 414/541, 545, 557, 556, 595, 598; 187/9 R, 9 E, 12; 280/163, 164 R, 166, 289 WC

[56] References Cited

U.S. PATENT DOCUMENTS

| | | | |
|---|---|---|---|
| 3,211,307 | 10/1965 | Neaverson et al. | 414/539 |
| 3,651,965 | 3/1972 | Simonelli et al. | 414/540 |
| 3,918,596 | 11/1975 | Ward | 414/545 |
| 4,043,427 | 8/1977 | Ackerman | 187/12 |
| 4,121,695 | 10/1978 | Carpenter | 414/539 |
| 4,124,096 | 11/1978 | Dudynskyj et al. | 414/539 X |
| 4,124,130 | 11/1978 | Rohrs et al. | 414/539 |
| 4,466,771 | 8/1984 | Thorley et al. | 414/545 X |
| 4,474,527 | 10/1984 | Risner et al. | 414/540 |

FOREIGN PATENT DOCUMENTS

| | | | |
|---|---|---|---|
| 904802 | 7/1972 | Canada . | |
| 1008817 | 4/1977 | Canada . | |
| 1051390 | 9/1979 | Canada . | |
| 1066668 | 11/1979 | Canada . | |
| 1087555 | 10/1980 | Canada . | |
| 1088467 | 10/1980 | Canada . | |
| 1092555 | 12/1980 | Canada . | |
| 1100102 | 4/1981 | Canada . | |
| 1141713 | 2/1983 | Canada . | |
| 1150678 | 7/1983 | Canada . | |
| 2106857 | 4/1983 | United Kingdom | 414/545 |

OTHER PUBLICATIONS

Paraplegia News Magazine, Jul. 1988, vol. 42, No. 7, pp. 7, 18, 38.

"Joyride-The Wheelchair Lift" brochure-4/1987.

*Primary Examiner*—Frank E. Werner

*Attorney, Agent, or Firm*—Charles J. Prescott

[57] ABSTRACT

A wheelchair lift for a van adapted to be installed into a recess formed into the rear of the van floor and bumper assembly. The lift includes a pair of spaced apart guide rails, each securely connectable into the sides of the recess so that they lie in spaced, longitudinally disposed verticle planes, the guide rails sloping diagonally downward toward the rear of the van. The lift also includes a movable platform whose central bed is horizontally disposed between spaced parallel side panels and adapted to receive a wheelchair or the like thereatop. A pair of spaced-apart rollers rotatably connected to each side panel engage within the guide rails to facilitate translation of the platform within the guide rails while maintaining the bed generally horizontal. A length of drive chain is connected at one end to each guide rail or van floor structure, each drive chain extending partially around a sprocket rotatably secured to each side panel, then extending to a drive device which controllably retracts and extends the drive chain to raise and lower the platform.

13 Claims, 5 Drawing Sheets

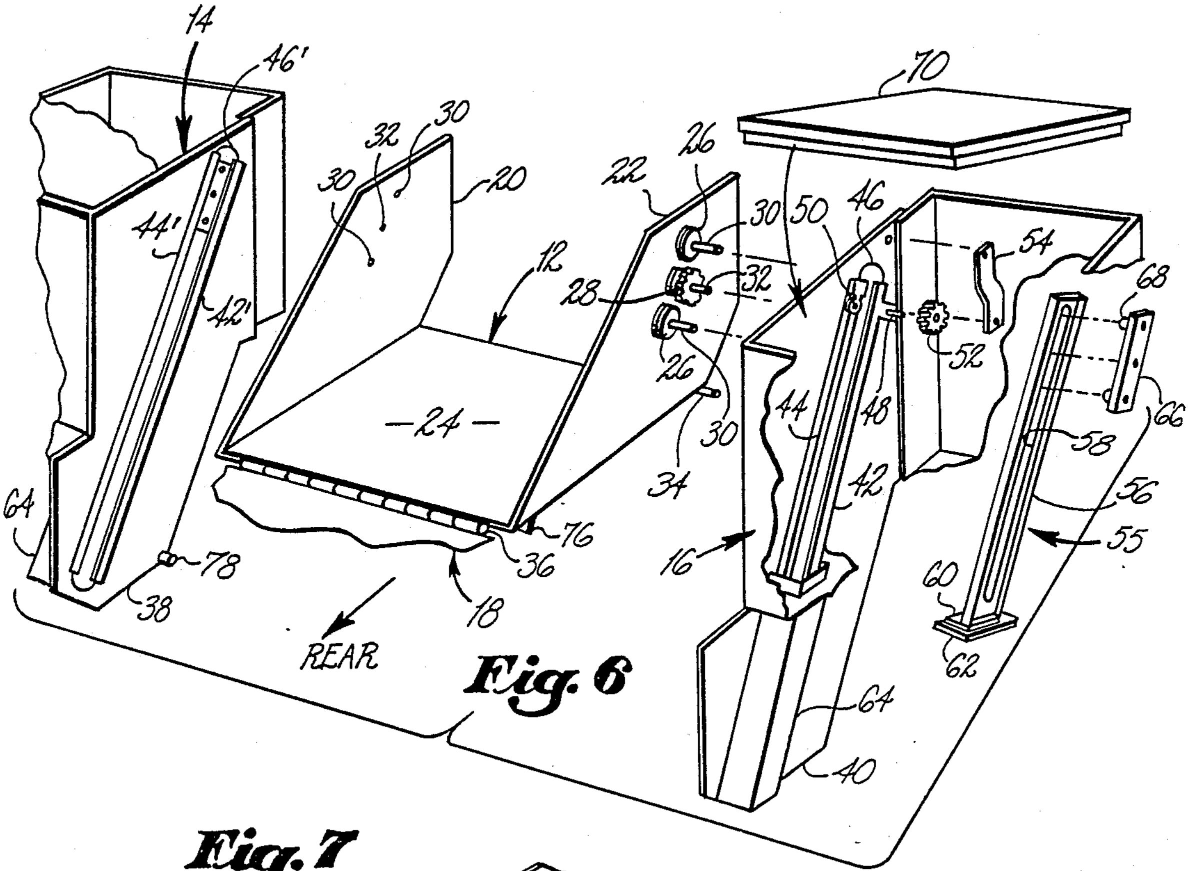
Fig. 6
Fig. 7
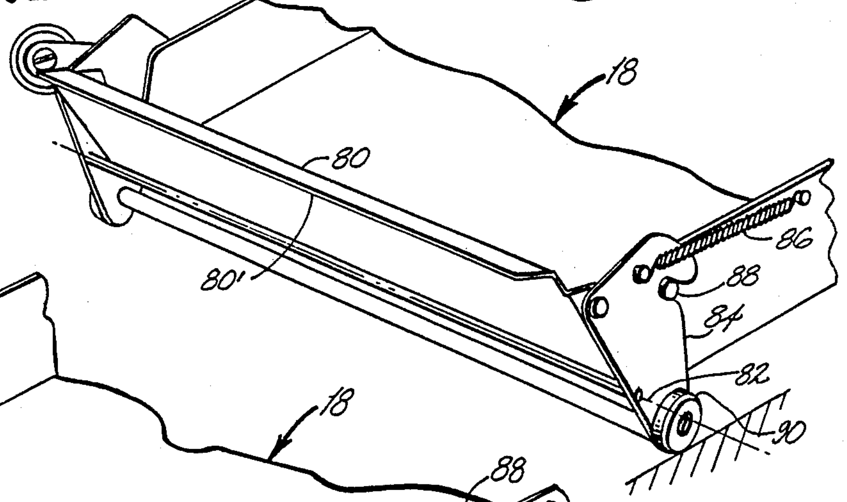
Fig. 8
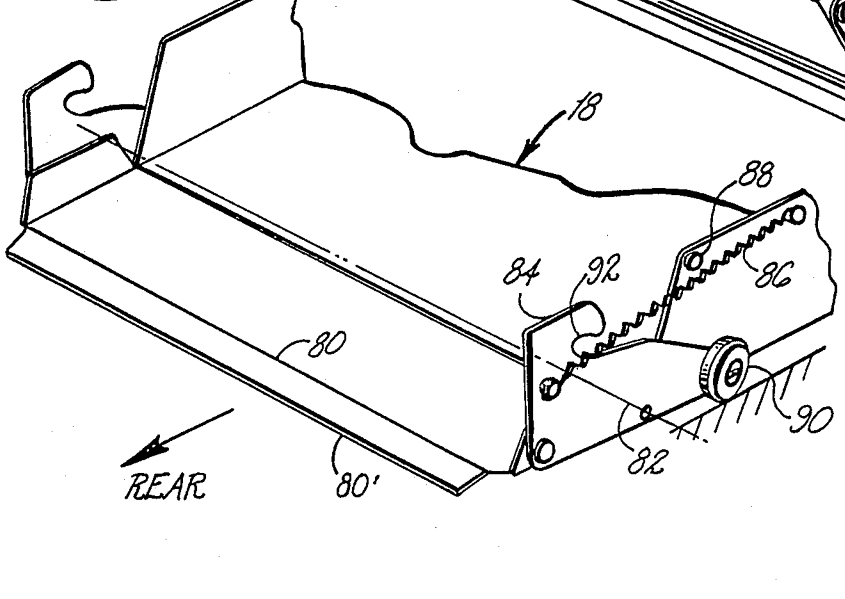

WHEELCHAIR LIFT FOR VEHICLES

BACKGROUND OF THE INVENTION

The present invention relates generally to lifting mechanisms in conjunction with vehicles, and more particularly to a wheelchair lift facilitating entrance into and egress from a van by a wheelchair user.

A number of U.S. patents are directed to wheelchair lifts for vans as follows:

Williams et al., U.S. Pat. No. 3,847,292
Manning, U.S. Pat. No. 3,912,048
Dake, U.S. Pat. No. 4,096,955
Gates, U.S. Pat. No. 4,133,437
Dake, U.S. Pat. No. 4,142,641

However, none of these devices neither incorporate a chain device mechanism of any sort, nor do they provide rear entry into the vehicle.

The Ricon Corporation of Sun Valley, Calif. provides a van lift which provides rear entry into the van, there model designation "Classic R30A Rider". However, this device appears to rely upon parallel arm linkage and does not utilize a recess cut into the bumper and floor of the rear of the van.

Another additional unpatented device offered by South Coast Dodge of Costa Mesa, Calif. does provide for rear entry by wheelchair users into the van. This device, however does not utilize the benefits of a recess into the rear of the van structure and does not include a chain drive mechanism to activate the platform.

Several Canadian patents are also known to applicant as follows:

Rice et al., 1,141,713
Hall, 1,051,390
Hawks, 1,092,555 and lower the platform.

It is therefore an object of this invention to provide a wheelchair lift system to be incorporated into, and provide for, rear entry into the van by wheelchair users.

It is another object of this invention to provide improved physical accessability into and out of a van equipped with the present invention by the utilization of a recess formed into the rear of the vehicle.

It is yet another object of this invention to provide a van lift system for wheelchair users with improved reliability and a unique drive chain and drive means arrangement for lifting and lowering the platform.

It is yet another object of this invention to provide a rear entry wheelchair lift for vans which allows the van to be completely closed to conceal all related structure when not in use.

In accordance with these and other objects which will become apparent hereinafter, the instant invention will now be described with reference to the accompanying drawings in which:

BRIEF DESCRIPTION OF THE DRAWINGS

FIG. 6 is a perspective view of the guide rails, platform and guide rail dust shield of the invention.

FIG. 7 is a perspective view showing the tailgate and safety gate members of the preferred embodiment of the invention above the ground.

FIG. 8 is a perspective view showing the tailgate and safety gate members of the preferred embodiment of the invention atop the ground.

DETAILED DESCRIPTION OF THE INVENTION

Figure 1:
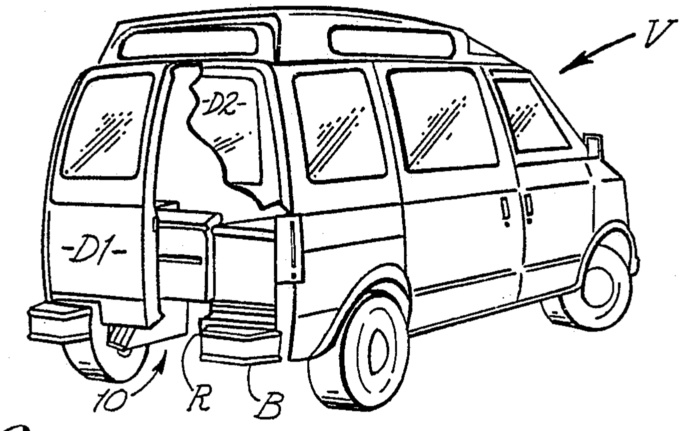
FIG. 1 is a rear perspective partially broken view of a van having the invention installed therein.
Figure 2:
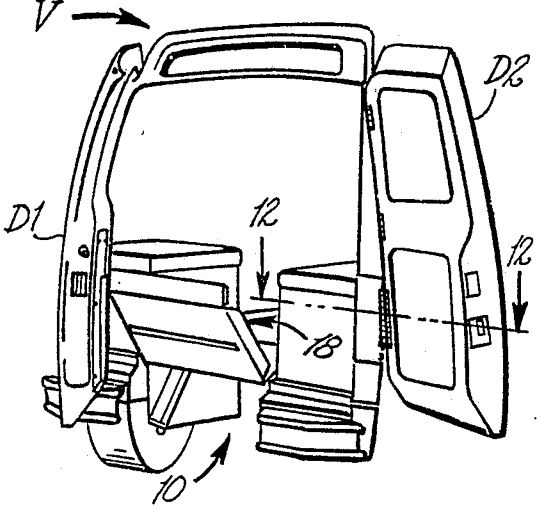
FIGS. 2 to 5 are rear perspective views of the rear portion of the van showing the invention in progressive stages of deployment.
Figure 3:
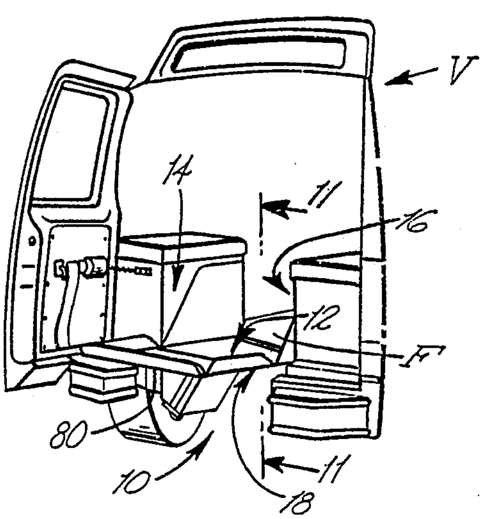
Figure 4:
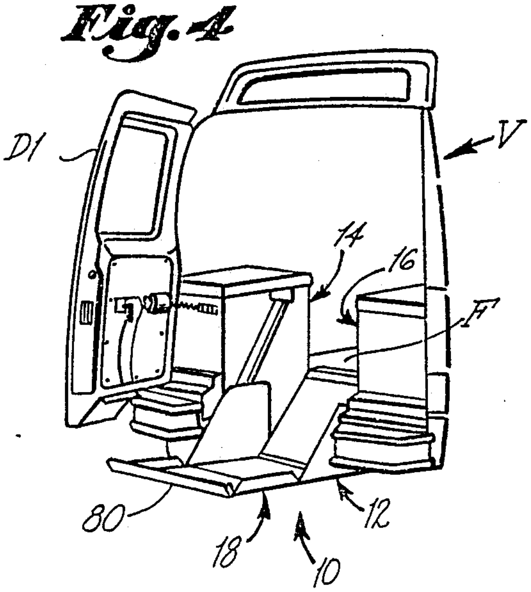
Figure 5:
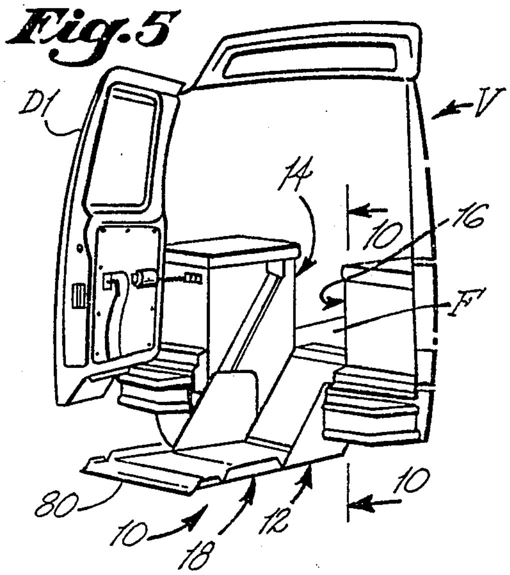

Referring now to the drawings, and particularly to FIGS. 1 to 5, the invention is shown generally at numeral 10 installed into the recess R formed into the rear of the floor F and bumper B of a conventional van V. The recess R is formed centrally through the bumper B and forwardly therefrom to accommodate the geometry of the lift 10. Suitable structure is required to maintain the structural integrity of the van V resulting from the formation of recess R. Guide rail assembly panels 14 and 16 are rigidly interconnected to the side margins of recess R.

In FIG. 1, the van V is shown in its closed configuration wherein the lift is stored therewithin. In FIGS. 2 to 5, deployment of the lift is shown in various stages as follows: in FIG. 2, the tailgate 18 is reclining toward a horizontal position; in FIG. 3, the tailgate 18 has moved into a horizontal position above the roadway; then in FIG. 4, the entire platform 12 and connected tailgate 18 and safety gate 80 have been moved closer to the roadway wherein, in FIG. 5, the entire movable portion of the assembly rests horizontally atop the roadway surface.

It will thus be now observed that one of the main features and benefits of the present invention 10 is that, because it is installed into recess R, very little additional clearance behind the bumper B of the vehicle V is required to load and unload a wheelchair user from the van V. Additionally, the wheelchair and its user rest atop the bed of platform 12 and, as it is moved upwardly, the head and upper torso of the user more easily fit within the conventional raised roof of the van V without the need for further notching or modification thereto. Likewise, the conventional doors D1 and D2 require no modification; however, structure disposed on the undersurface of tailgate 18 as best seen in FIG. 1 is provided to replace the normal weather seal associated with the central portion of the trailing edge of the floor F which has been removed to form recess R.

Figure 9:
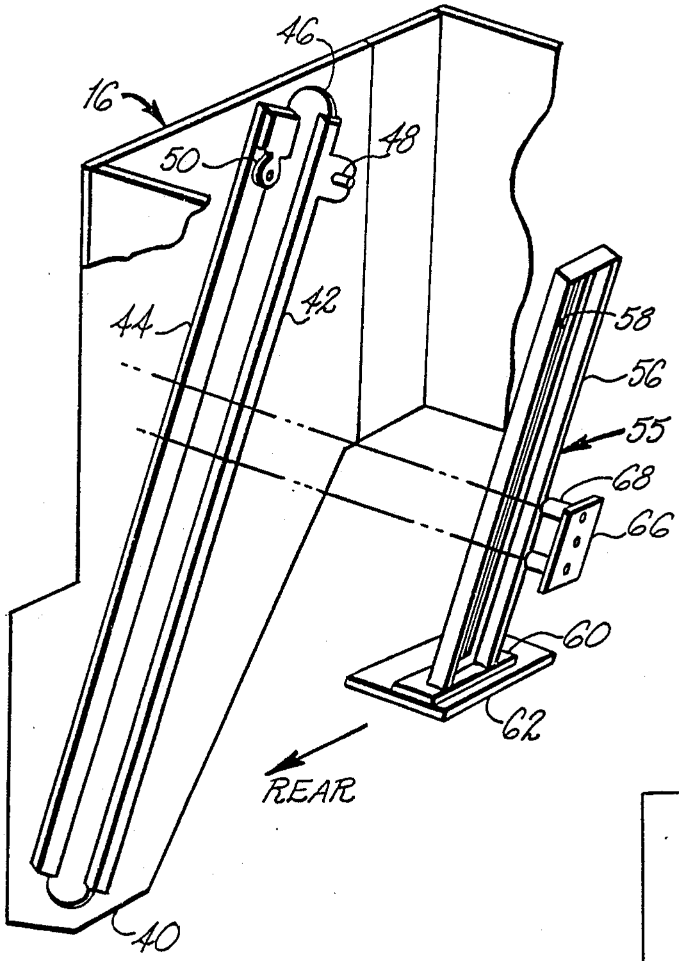
FIG. 9 is an enlarged partial perspective view of the left side guide rail assembly of the invention.

Referring now also to FIGS. 6 and 9, all of the basic structural components, absent the drive system, are there shown. Side panels 38 and 40 are rigidly interconnected to the side margins of the recess R formed into the floor F of the van V. This may be accomplished in various ways, including the formation of closable box structure to house a portion of the drive means to be described herebelow. Moveably disposed between the side panels 14 and 16 is platform 12 having a horizontally disposed bed 24 and upwardly extending side panels 20 and 22.

Diagonally disposed on generally upright and longitudinally positioned side panels 38 and 40 are rigid rails 42/42' and 44/44' mounted within apertures 46 and 46' which cooperate to form a slotted guide rail to receive a pair of rollers 26 mounted on each side panel 20 and 22 for rotation about shafts 30. The rails 42, 42', 44 and 44' are generally V-edged to mate within grooves formed into rollers 26 to prevent lateral movement of platform 12. The rollers 26 of each pair of rollers are spaced apart sufficiently to also maintain bed 24 in a horizontal position throughout its travel.

One sprocket 28 is mounted to each side panel 20 and 22 on shaft 32 for rotation. Sprocket 28 is positioned slightly outboard of rollers 26 to engage the drive chain as will be herebelow described.

Referring particularly to FIG. 9, rails 42/42' include idler sprocket shaft 48 (48' not shown), while rail 44/44' include drive chain anchor 50 (50' not shown). The purpose of these elements will be herebelow described with respect to the drive system itself.

The guide rails 42/44 and 42'/44' slope sharply downwardly and rearwardly and extend below the floor of the van. To prevent dust and water from entering the van V, cover 64 as best seen in FIG. 6 is connected therearound to the outer surface of panels 38 and 40. Then, to fully insure sealing, a sliding guide rail seal shown generally at numeral 55 is also provided for each guide rail. This sliding seal 55 is formed of an elongated channel member 56 having elongated aperture 58 centrally disposed there along as shown. A rigid plate 60 is transversely connected at the lower end of channel 56 which supportively receives a sheet of neoprene rubber 62 connected thereto. Bracket 66 includes bosses 68 which are mounted over shafts 30 and slidably move through apertures 58 along with platform 12 within guide rails 42/44 and 42'/44'. Thus, as bracket 66 moves, sliding seal 55 is also made to translate linerally so that neoprene layer 62 wipes the inner edges of rails 42, 42', and 44 and 44' along their lower portions which are beneath the floor and exposed to the elements. Neoprene layer 62 also sealably engages the inner walls of covers 64.

Figure 10:
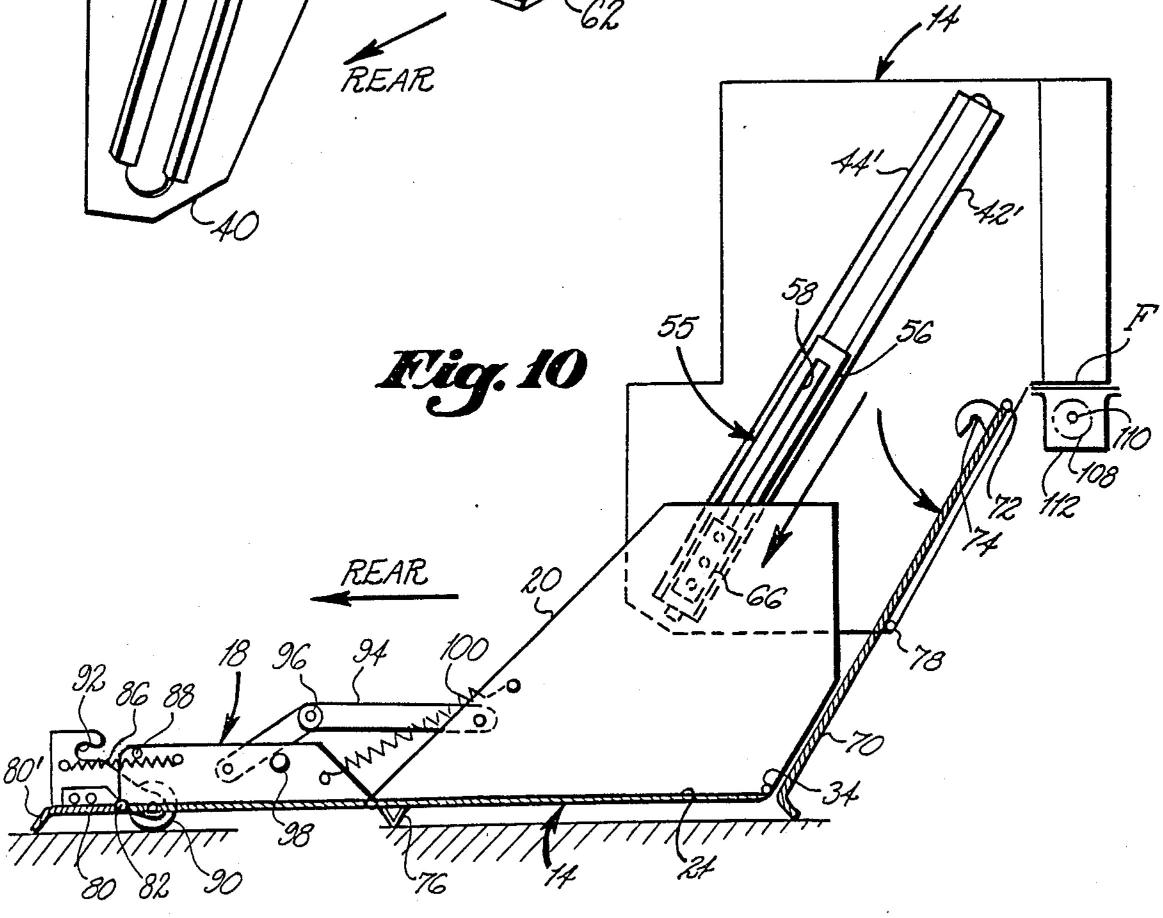
FIG. 10 is a section view in the direction of arrows 10—10 in FIG. 5.

Referring now also to FIGS. 7, 8 and 10, a tailgate shown generally at numeral 18 is hingedly connected along its leading transverse edge about hinge 36 to the trailing edge of bed 24. Tension spring 100, disposed on either side between side panels 20 and 22 and the upwardly extending side margins of tailgate 18 respectively, serve to counterbalance the weight of the tailgate 18 while two-part linkage 94, pivotally connected at 96 and also connected at their opposite ends to side panels 20 and 22 and the side margins of safety gate 18, respectively, act on stop 98 so as to establish the deployed, coplaner relationship between bed 24 and the central portion of tailgate 18. Bracket 76 is provided to support the platform 12 slightly above the ground.

A safety gate 80 is also provided which is, itself hingedly connected along its transverse leading edge of the trailing edge of tailgate 18 along axis 82. Tailgate 80 is maintained in its upwardly extending position as shown in FIG. 7 by tension springs 86 rotatably biasing brackets 84 against stop 88 at slot 92. However, wheel 90 is arranged downwardly and forwardly extending on brackets 84 in relation to axis 82 so that, as tailgate 18 is in close proximity to the ground, wheel 90 pivots the tailgate about axis 82 into its horizontal position as shown in FIG. 8 and 10.

Figure 11:
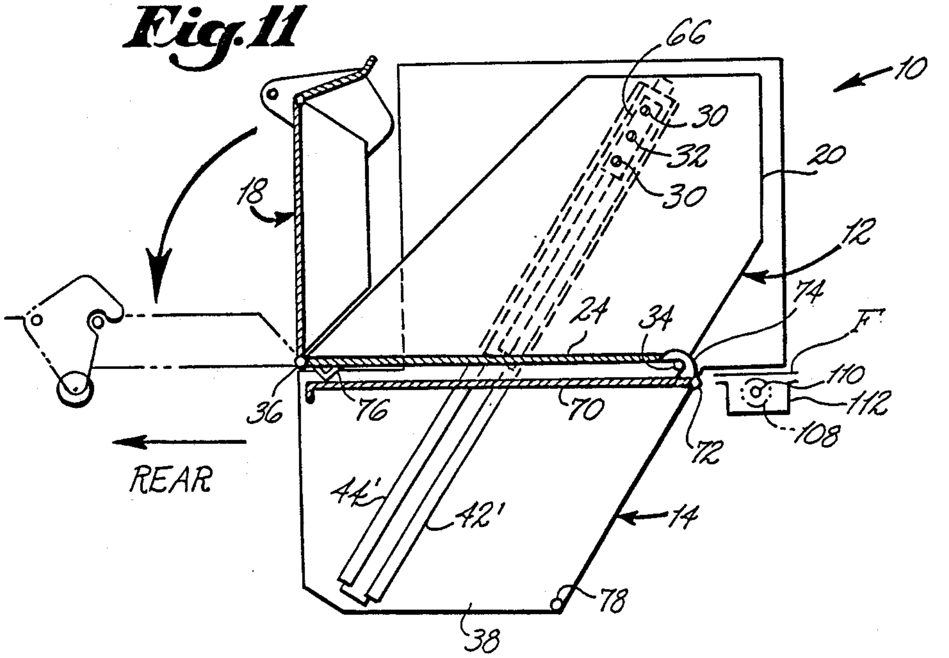
FIG. 11 is a section view in the direction of arrows 11—11 in FIG. 3.

Referring now to FIGS. 10 and 11, the invention 10 is shown in its in its downward, deployed position in FIG. 10 and its upper, stored position in FIG. 11. A front panel 70 generally of the same width as platform 12 and recess R for preventing the wheelchair from rolling beyond the leading edge of bed 24 is there shown hingedly connected to the front margin of recess R along hinge 72. In its lower position, front panel 70 is allowed to downwardly pivot as shown in FIG. 10 about hinge 72 so as to contact and be supported by bracket 78 as also seen in FIG. 6. As platform 12 nears its upper position as shown in FIG. 11, hook 74, connected to front panel 70, is adapted to be acted upon by pin 34 connected to platform 12 as also seen in FIG. 6. By this arrangement, then, as platform 12 is moved to its fully upper position wherein bed 24 is generally coplanar with the floor F, front panel 70 is drawn into its upper generally horizontal stored position adjacent bed 24 and against bracket 76.

Also depicted in FIGS. 10 and 11 is the sliding translation of seal 55 and its sliding bracket 66 as has been previously described. Further shown in these figures is transversely disposed channel 112 connected to floor F which houses cross shaft 110 having gears 108 disposd adjacent each end as will be herebelow described.

Figure 13:
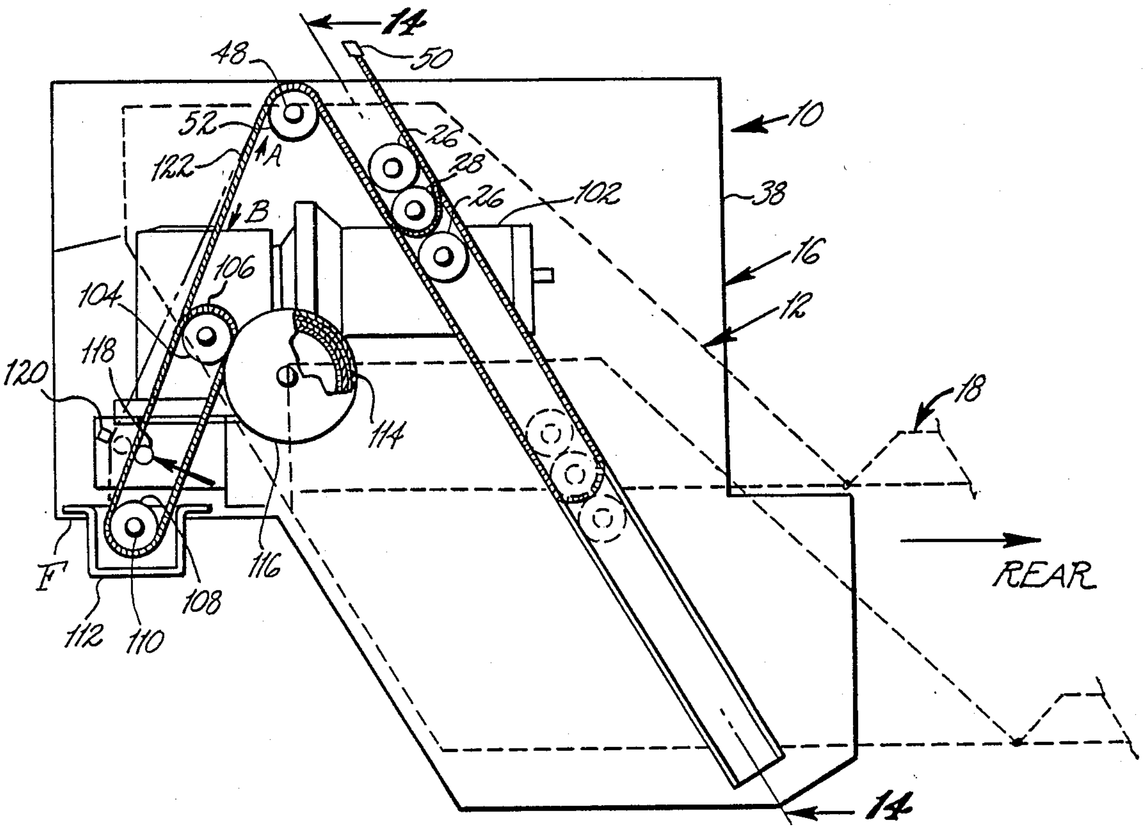
FIG. 13 is a schematic view in the direction of arrows 13—13 in FIG. 12.
Figure 14:
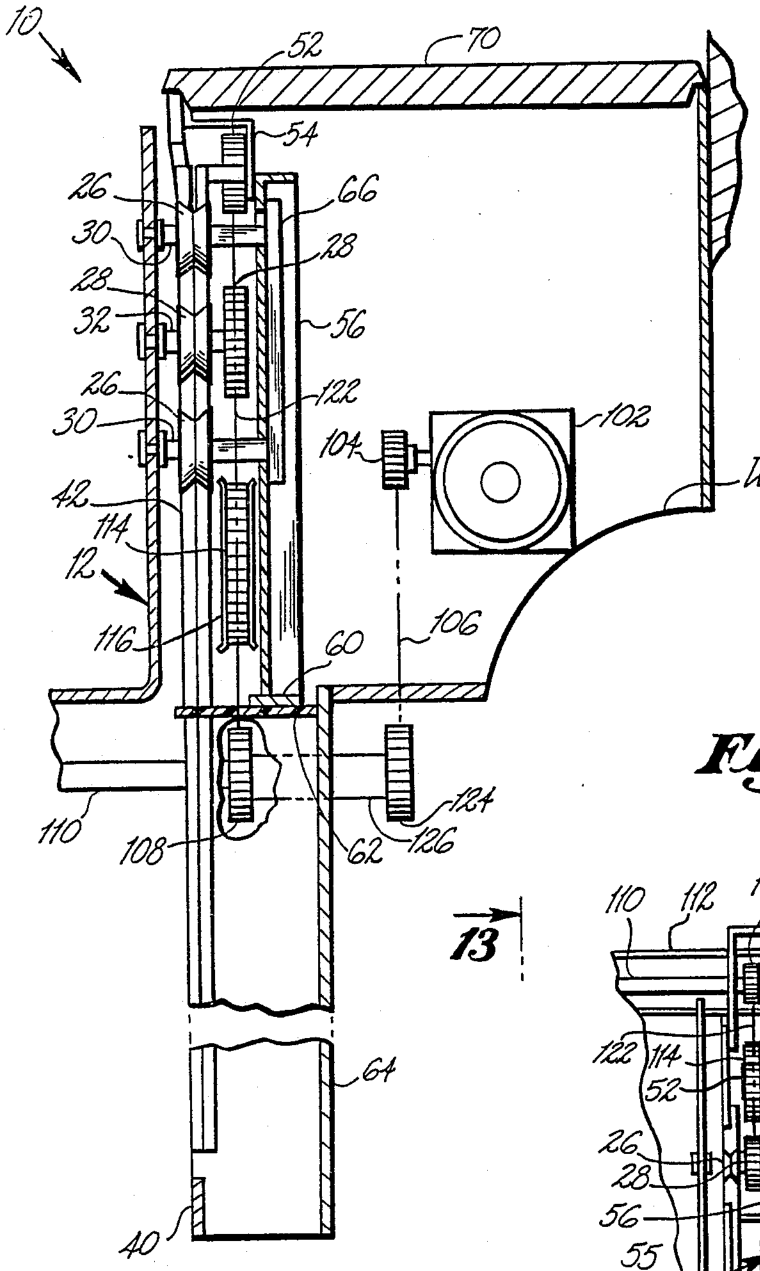
FIG. 14 is a section view in the direction of arrows 14—14 in FIG. 13.
Figure 12:
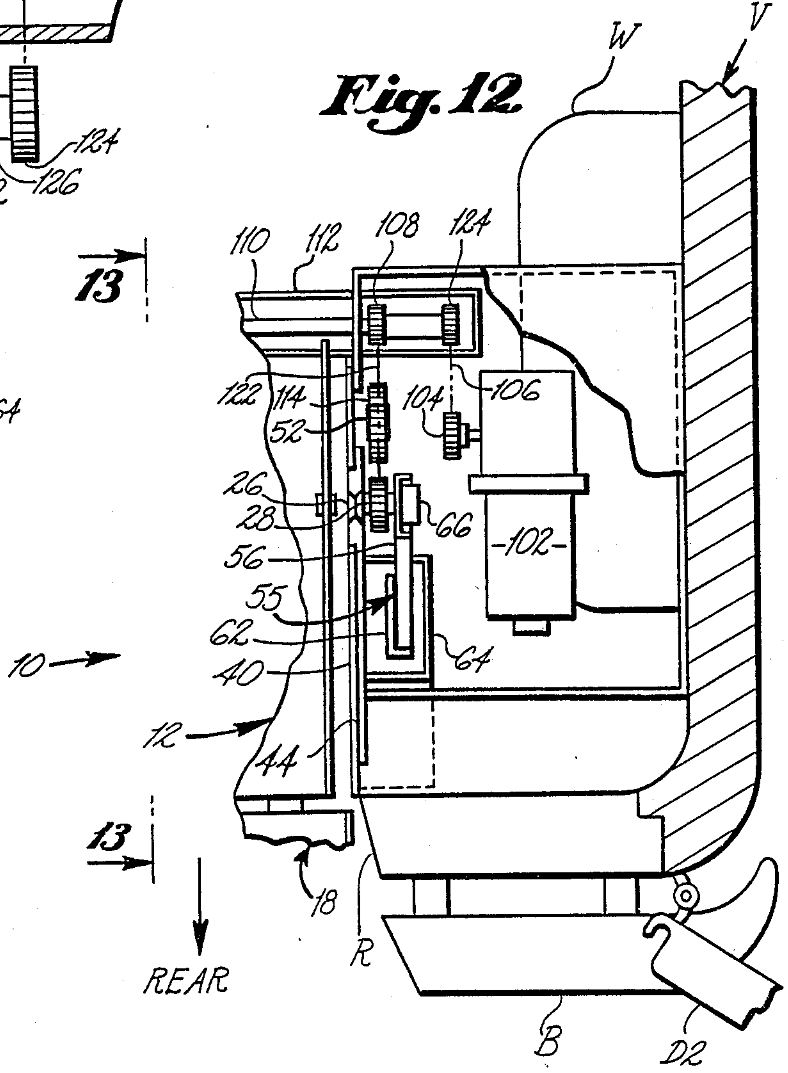
FIG. 12 is a section view in the direction of arrows 12—12 in FIG. 2.

Referring now to FIGS. 12, 13 and 14, the drive system itself is there shown. A drive motor 102, electrically powered by the van storage battery, provides rotary output at gear 104 which drivingly engages endless chain 106. Chain 106 then acts to drive gear 124 connected to collar 126 having gear 108 disposed at its other end. Cross shaft 110 is connected within collar 126 at either end so that only one drive motor 102 is required to power the drive mechanism positioned at either side of platform 12.

Gear 108, having a mirror image counterpart on the other side of the platform (not shown) acts upon a length of drive chain 52. This drive chain 52 is connected at one end to anchor 50 previously described and as best seen in FIG. 9 connected to the upper end of rails 44 and 44'. The drive chain 52 then extends parallel to rail 44 wrapping 180° around sprocket 28 and then back diagonally upwardly along rail 42 to interengage around idler sprocket 52 which is rotatably mounted onto sprocket shaft 48 previously described and best seen in FIG. 9 connected at the upper end of rails 42 and 42'.

The drive chain 52 then downwardly extends to interengage around gear 108, passing therearound through 180° and then upwardly extending to engage around recoil member 116.

Thus, by this arrangement, as drive motor 102 rotatably drives output gear 104 and continuous intermediate chain 106, drive chain 52 is either forced to extend in the direction of arrow A in FIG. 13 or retract in the direction of arrow B. Recoil member 116 collects the end portion 114 of drive chain 52 thereon and to controlably extend same as required by drive motor 102.

As drive chain 52 is extended in the direction of arrow A, the platform 12, being acted upon by drive sprocket 28 is allowed by gravity, guided by rollers 26, to downwardly extend into the position shown in phantom in FIG. 13. Controllably retracting the drive chain 52 in the direction of arrow B moves the platform via drive sprocket 28 back upwardly into its stored position. Note the 2:1 mechanical advantage gained by this arrangement of drive chain 52 around drive sprocket 28.

To reiterate, cross shaft 110 is provided to extend transversely across and adjacent the front margin of recess R so as to operably dispose gears 108 so as to facilitate the drive mechanism on both sides of platform 12 for balanced operation. The cross shaft 110 is protected from debris and the elements by channel 112 which is connected to the floor F of the van V.

In order to stop drive motor 102 as the platform 12 contacts the ground, an idler roller 118 is provided which is biased against chain 52 in the direction of the arrow as seen in FIG. 13. Thus, as the platform 12 contacts the ground and drive motor 102 continues to operate, slack occurs in chain 52 causing it to be displaced into the position shown in phantom by idler roller 118. Switch 120 is provided connected to one side panel 38 which interrupts power to drive motor 102 when drive chain 52 reaches its position shown in phantom.

A conventional magnetic shut-off switch is provided to automatically act between the moveable platform 12 and one guide rail assembly 14 or 16 so as to interrupt power to the drive motor 102 when the platform 12 reaches its upper position.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

I claim:

1. A wheelchair lift for a van adapted to be installed into, and operate within, a recess formed into the rear end of the horizontal van floor, said recess having opposing side and front margins and being open at the rear thereof, said lift comprising:

a pair of parallel spaced apart elongated guide rails, each said guide rail securely connected against one said recess side;

each said guide rail lying in a vertical, longitudinally disposed plane and disposed diagonally downward toward the rear of the van;

a platform having a horizontally disposed bed and upwardly extending side structure and adapted to receive a wheelchair or the like atop said bed;

said platform having an upper position wherein said bed is aligned with the van floor and a lower position wherein said bed is atop the ground;

said platform also having a main transverse axis horizontally disposed above said bed and passing through the rotational axis of a sprocket coaxially mounted for rotation on each said side structure;

a pair of spaced apart rollers mounted for rotation on each said side structure adjacent each said sprocket, each said roller adapted to rollably translate within the corresponding said guide rail;

each said roller pair adapted to interengage within the corresponding said guide rail to maintain said bed horizontal as said platform is raised and lowered between its upper and lower positions;

a length of drive chain fixed at its first end adjacent the upper end of said guide rail, each said drive chain extending from said fixed end downwardly along each said guide rail around said sprocket and back upwardly along each said guide rail to engage a drive means connected to the van floor and operably connected to each said drive chain;

each said drive means for controlledly extending and retracting each said drive chain adjacent its second end whereby the corresponding said sprocket is lowered and raised, respectively, along the corresponding said guide rail.

2. A wheelchair lift as set forth in claim 1, wherein said drive means includes:

an idler sprocket operably connected for rotation about a transverse axis adjacent the upper end of each said guide rail;

each said idler sprocket adapted to supportively receive one said drive chain and to redirect said drive chain from around said sprocket toward said drive means;

a drive motor operably connected to rotate a drive gear for each said drive chain;

each said drive gear controllably extending and retracting one said drive chain.

3. A wheelchair lift as set forth in claim 2, wherein said take-up means comprises:

a recoil drum adapted to take up and release each said drive chain second end as said drive chain is retracted and extended, respectively.

4. A wheelchair lift as set forth in claim 1, wherein said drive means includes:

an idler sprocket operably connected for rotation about a transverse axis adjacent the upper end of each said guide rail;

each said idler sprocket adapted to supportively receive one said drive chain and to redirect said drive chain from around said sprocket toward said drive means;

a drive motor operably connected to rotate an elongated cross shaft;

said cross shaft connected transversely for rotation to the van floor and having a drive gear disposed adjacent each end of said cross shaft to operably engage one said drive chain;

said cross shaft and said drive gears controlably extending and retracting said drive chains.

5. A wheelchair lift as set forth in claim 4, wherein said take-up means comprises:

a recoil drum adapted to take up and release each said drive chain second end as said drive chain is retracted and extended, respectively.

6. A wheelchair lift as set forth in claim 1, wherein:

each said drive rail comprises a pair of parallel, spaced, opposing V-shaped members;

each said roller is V-grooved to mate against and be secured for translation between and along said pair of V-shaped members.

7. A wheelchair lift as set forth in claim 1, further comprising:

a front panel hingedly connected along its leading edge to said recess front margin;

said platform side structure and said front panel having cooperating structure adapted to pivot said front panel upwardly to a generally horizontal position adjacent said platform bed when said platform is in its upper position and to pivot said front panel downwardly so as to dispose said front panel trailing edge adjacent the ground so as to cover the gap formed between the leading edge of said platform bed and said recess front margin when said platform is in its lower position.

8. A wheelchair lift as set forth in claim 1, further comprising:

a generally flat tail gate hingedly connected along its leading edge to said platform along its trailing edge;

said tail gate and said platform having cooperating structure adapted to pivot said tail gate upwardly to a generally upright position when said platform is in its upper position and to pivot said tail gate downwardly to a generally horizontal position atop the ground when said platform is in its lower position.

9. A wheelchair lift as set forth in claim 8, further comprising:

a safety gate hingedly connected along its leading edge to said tail gate trailing edge;

said safety gate having structure adapted to pivotally bias it to an upwardly extending position when said platform is positioned above the ground;

said safety gate also having structure adapted to pivot it downwardly to a generally horizontal position atop the ground when said platform is in its lower position.

10. A wheelchair lift as set forth in claim 1, further comprising:

an elongated dust shield slidably mounted outwardly adjacent and parallel to each said guide rail for inhibiting dust, debris and moisture from entering the van along said recess sides and for cleaning said guide rails as said life is operated.

11. A wheelchair lift as set forth in claim 1, further comprising:

a chain slack sensor biased against each said drive chain and cooperatively acting with a shut off switch connected to said guide rail adopted to stop said drive means from extending said drive chain when said platform reaches its lower position resting atop the ground.

12. A wheelchair lift as set forth in claim 11, further comprising:

an automatic shut off switch positioned between said platform and one said guide rail adopted to stop said drive means from retracting said drive chain when said platform reaches its upper position.

13. A wheelchair lift as set forth in claim 1, wherein:

each said sprocket is disposed between said rollers of each said pair of rollers;

each sprocket axis and the axes of the corresponding said pair of rollers coplaner.

* * * * *

UNITED STATES PATENT AND TRADEMARK OFFICE
CERTIFICATE OF CORRECTION

PATENT NO. : 4,907,936

DATED : March 13, 1990

INVENTOR(S) : Fernand J. Bourdage

It is certified that error appears in the above-identified patent and that said Letters Patent is hereby corrected as shown below:

Column 8, line 5, rewrite "life" as -- lift --.

Signed and Sealed this

Fifth Day of February, 1991

*Attest:*

HARRY F. MANBECK, JR.

*Attesting Officer*

*Commissioner of Patents and Trademarks*